June 21, 1966 R. CHELMINSKI 3,257,168
PROCESS FOR MANUFACTURE OF PHOSPHORIC ACID
Filed March 30, 1961 2 Sheets-Sheet 1

INVENTOR
ROMAN CHELMINSKI
BY
Curtis, Morris & Safford
ATTORNEYS

June 21, 1966 R. CHELMINSKI 3,257,168
PROCESS FOR MANUFACTURE OF PHOSPHORIC ACID
Filed March 30, 1961 2 Sheets-Sheet 2
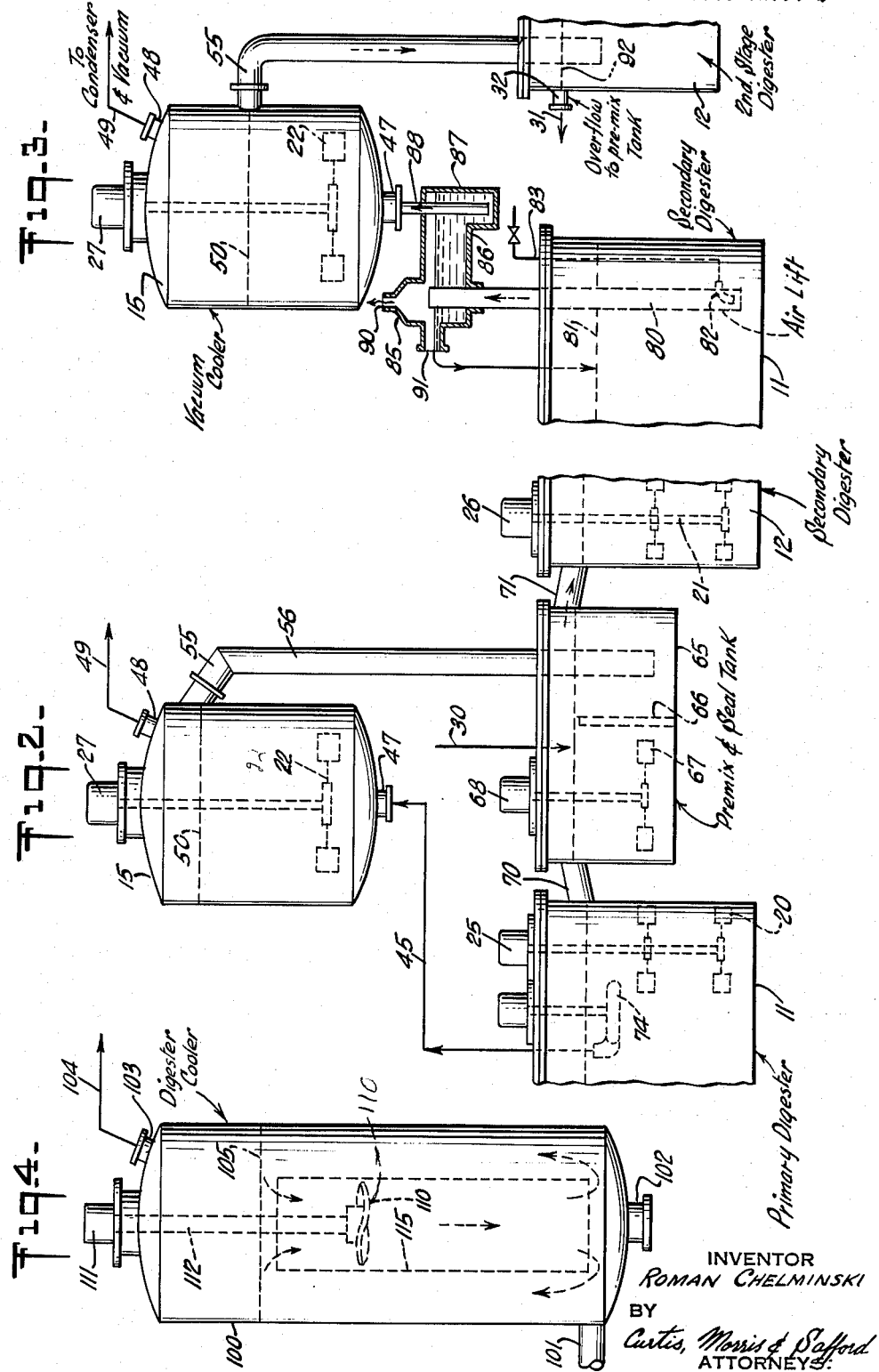
INVENTOR
ROMAN CHELMINSKI
BY
Curtis, Morris & Safford
ATTORNEYS

United States Patent Office 3,257,168
Patented June 21, 1966

3,257,168
PROCESS FOR MANUFACTURE OF
PHOSPHORIC ACID
Roman Chelminski, Wilton, Conn., assignor to Singmaster & Breyer, New York, N.Y., a co-partnership
Filed Mar. 30, 1961, Ser. No. 99,527
8 Claims. (Cl. 23—165)

This invention relates to processes for various chemical reactions in which it may be desired to have a plurality of sequential stages continuously operating at substantially different temperature levels with a cooling step between such stages and, more particularly, to such processes where a cooling step is achieved by vacuum cooling under conditions effecting removal of large quantities of heat but without such a sharp or substantial rapid temperature drop as would promote disadvantageous or undesired precipitation or crystallization conditions in the material being cooled.

As will be understood, there are a variety of chemical processes in which it is desired or necessary to cool large volumes of liquid reaction mixtures from one stage or reaction to achieve a very substantial temperature drop for a subsequent stage of the process for such purposes as, for example, dissipating undesired heat of an exothermic reaction, achieving controlled prepicitation of a desired product, preventing corrosion or product damage in the subsequent stage of the process, minimizing colloidal dispersion or contamination of a desired product and/or excessive production of undesired byproducts, etc. Aside from the purely economic or engineering difficulties which may be experienced in attempting rapidly to remove large quantities of heat from large volumes of liquids by conventional methods such as air cooling or flash evaporation or indirect heat exchanger cooling, additional difficulties may be encountered with certain types of chemical reactions with which a rapid and substantial temperature drop induces undesired precipitation of suspended or dissolved materials from the liquid being cooled or induces precipitation of an undesired type or size of precipitate crystal or induces precipitation at an undesired point in the process or under such conditions as to form scaling or other disadvantageous conditions.

According to this invention, however, there is provided for cooling large volumes of liquid or slurry, even in a continuous process, by vacuum cooling effecting substantial temperature reductions (e.g., of 20°–50° F. or more) but at a progressive and controlled rate whereby increments of higher temperature material entering the cooling step are not subjected to such a sharp or sudden temperature drop as would induce undesired conditions of precipitation or crystallization of components in the cooling step, but are made to lose heat to partially cooled portions of the materials, and whereby increments of material from which heat is being quickly extracted for complete removal from the cooling step are subjected to only a small drop in temperature (e.g., less than about 5° F.) notwithstanding the obtaining of a much greater temperature drop across the entire cooling step.

Although this invention and the teachings hereof are to be understood as applicable to or advantageous in a wide variety of different chemical processes, particularly those involving continuous commercial scale handling and processing of large volumes of liquids or slurries including a component which readily precipitates upon a substantial drop in temperature, there may be noted, as illustrative of processes to which this invention particularly relates, such processes as the manufacture of phosphoric acid by treatment of calcium phosphate with sulfuric acid, the cooling of highly saturated solutions of urea to precipitate the product, the manufacture of 2,4-dichlorphenoxyacetic acid precipitated from a hot solution of the sodium salt by adding a mineral acid with controlled cooling to produce the desired form of precipitate, the digestion of certain metal ores such as uranium or lithium where high temperature is desired for quick dissolution but low temperature improves filtration and reduces maintenance, etc. For simplicity and clarity herein, however, a process for the production of phosphoric acid embodying and for practicing this invention will be used as illustrative of the invention and a basis for further description of the teachings in accordance therewith.

One object of this invention is to provide, in a process of the character described, for receiving high temperature liquid or slurry into a cooling step and cooling the liquid or slurry therein by vacuum-induced evaporation but under conditions where each increment of hot material from which heat is removed by such evaporation is subjected to a rapid or "flash" cooling temperature drop of only a small fraction of the temperature decrease which is undergone by the entire volume of liquid or slurry passing through the cooling step.

Another object of this invention is to provide, for a process of the character described, an arrangement for the vacuum cooling of a liquid or slurry by the flash removal of heat therefrom by vacuum-induced evaporation of liquid components thereof, and in which higher temperature portions of the material to be cooled are constantly admixed with lower temperature or partially cooled portions thereof, with the actual removal of heat from the system by flash evaporation constantly occurring on successive small increments of the material being cooled whereby the temperature drop of any particular increment at any particular moment caused by flash evaporation heat removal therefrom in but a small fraction of the total temperature decrease achieved on all the material being cooled.

A further object of this invention is to provide, in a process of the character described, for the cooling through a substantial temperature range of a liquid or slurry material which includes a component subject to precipitation upon cooling of the material, whereby a substantial or preponderant cooling of the hot material is achieved by direct transfer of heat from hot material entering the cooler to partially cooled material already therein, and further whereby the material in the cooler is constantly being admixed by agitation and circulated in the cooler so that heat is extracted from the material by flash evaporation at the surface of the material in the cooler, but only from such ever-changing increments of the material that the temperature drop of any particular increment at any particular moment is but a small fraction of the total temperature decrease achieved in the cooler.

Still another object of this invention is to provide vacuum apparatus of the character described for the progressive controlled cooling of liquid or slurry material introduced thereinto and from which heat is ultimately removed from the material to be cooled by vacuum-induced flash evaporation at the surface of the liquid or slurry material in the apparatus, and which apparatus further provides for the admixture of hot entering material with partially cooled material in the apparatus for partial cooling of the hot material by direct heat transfer to the cooler material and prior to circulation of hot entering material to the surface of the liquid or slurry for the flash evaporation removal of heat therefrom.

A still further object of this invention is to provide, in a process of the character described for the manufacture of phosphoric acid by digesting phosphate rock with a sulfuric acid, an arrangement for the high temperature reaction of the phosphate rock and sulphuric acid in one reaction stage in which the materials are highly corrosive, subjecting the material from the hot reaction stage to a vacuum cooling step in accordance herewith in which the temperature of the material is decreased substantially (e.g., of the order of 20° F.) to a condition of substantially less corrosiveness but under conditions of controlled cooling whereby gypsum and other components which precipitate from the hot reaction slurry are caused to precipitate and grow slowly upon existing nuclei during cooling rather than to precipitate on the walls of the cooler apparatus to form scale, and then subjecting said cooled material to a further digesting or precipitating step during which gypsum and other precipitating materials come out of solution as slowly grown large crystals of the desired crystal form rather than as a larger number of smaller crystals more difficult to separate in a subsequent filtering operation for the removal of precipitated byproducts from the desired phosphoric acid product.

Other objects and advantages of this invention will be apparent from the following description, the accompanying drawings, and the appended claims.

In the drawing:

FIG. 2 is a diagrammatic representation, partly broken away, of a modification of an arrangement embodying and for practicing this invention;

FIG. 3 is a partial view of a modified arrangement of apparatus embodying and for practicing this invention and illustrating modified means for introducing the hot material to be cooled into vacuum cooling apparatus in accordance herewith; and FIG. 4 is a somewhat diagrammatic representation of an additional embodiment of a vacuum cooling arrangement in accordance herewith.

Figure 1:
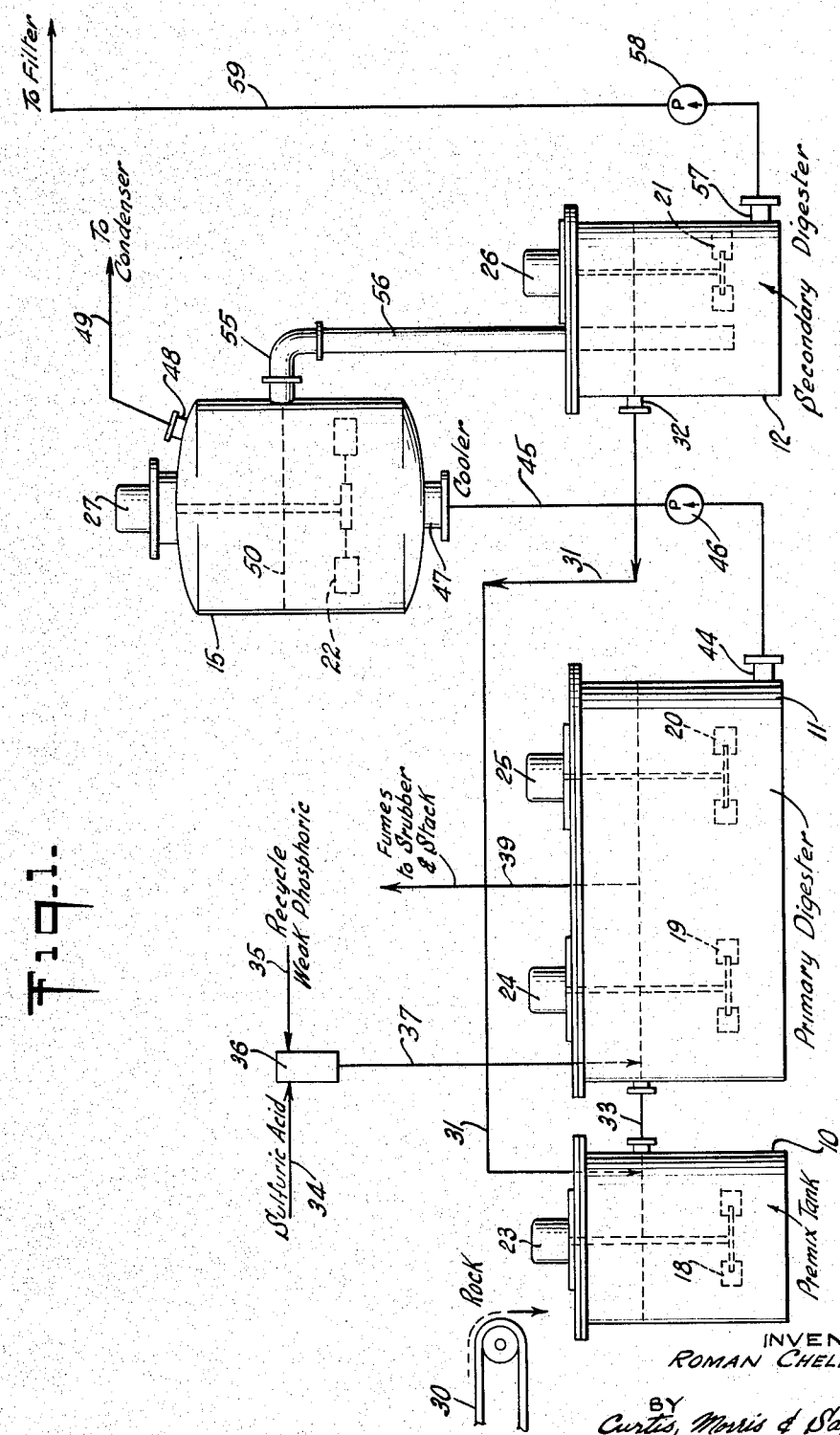
FIG. 1 is a somewhat diagrammatic or flow sheet type of representation of the steps and apparatus embodying and for practicing this invention as illustratively applied to a process for the manufacture of phosphoric acid.

Considering as illustrative of the type of process which this invention is particularly adapted to the manufacture of phosphoric acid, it will be understood that this material is conventionally produced from phosphate rock containing a substantial proportion of calcium phosphate. This material is solubilized as $P_2O_5$ by treatment of the rock with concentrated sulfuric acid and weak phosphoric acid in a digestion step productive of substantial amounts of heat of reaction and heat of solution. Upon cooling, calcium sulfate (gypsum) precipitates out of solution, along with various materials such as fluoro-silicates, etc., which must be filtered from a liquid phase in order to separate the phosphoric acid product. In such a process, as is well understood, solubilizing the phosphate content of the rock also produces the concomitant formation of oxides, silicates, sulfates, etc., of other components originally present in the starting material.

Particularly with phosphate rock materials containing less concentrated proportions of the phosphate it may be found that adequate digestion or recovery of $P_2O_5$ is difficult to obtain unless the acid digestion of the rock is conducted at relatively high temperatures of the order of 175° to 180° F. As also understood, the acid digestion of phosphate rock may give rise to substantial foaming problems inhibiting the efficiency or completion of the desired reaction unless the initial digestion is conducted at temperature levels of about 180° F. Yet the reaction mixture at such high temperature levels is of an extremely corrosive nature with regard to the pumping and handling and subsequent filtering apparatus or equipment necessary.

Accordingly, it may be desired to cool the initial reaction mixture substantially to promote precipitation of the undesired sulfate and oxide and silicate byproducts as well as to simplify the handling of the reacted material in subsequent stages of the plant where precipitate is filtered and washed for separation of the desired phosphoric acid. If such cooling is attempted in air coolers as by blowing air onto or into the surface of the slurry after digestion, some difficulty may be experienced in the control of the degree of cooling, especially with inevitable variations in the temperature and relative humidity of the cooling air, and such a cooling system may require relatively expensive and extensive apparatus for scrubbing the cooling air discharge to avoid contamination of the atmosphere with such products as silicon tetrafluoride, which is readily volatilized from the hot reaction mixture.

Alternatively, if it is attempted to effect the desired cooling by pumping the digestion slurry to a conventional vacuum flash cooler, in which heat removal is produced by evaporation of the water in the slurry within an evacuated cooler apparatus, other difficulties and disadvantages may be experienced such as, for example, scaling of the cooler walls, the formation of a large number of relatively small precipitate crystal (because of the sudden temperature drop) which may be difficult ultimately to filter or wash, etc. That is, the hot digestion liquid or slurry includes gypsum solids in hot phosphoric acid, supersaturated with dissolved gypsum, fluoro-silicates, etc. A rapid or flash cooling of such liquid slurry involving a sharp temperature drop (of as much as 5° F.) accompanied by evaporation of water from the slurry may instigate widespread precipitation of such materials to form scales or crystal growths on whatever solid surface may be at hand (e.g., the walls of the flash cooler apparatus) as well as forming a great number of small, almost colloidal, crystals which are difficult to filter in subsequent steps of the apparatus. If it is attempted to minimize some of the foregoing difficulties with a flash cooler or evaporation cooler type of arrangement, it may be necessary to pump extremely large volumes of slurry to the cooler apparatus in an attempt to reduce the temperature drop therein per unit of material entering, but such arrangement may not only require very large pumps and considerable horsepower consumption, but is rendered even more expensive by the fact that the hot slurry is being handled at a temperature where it is most corrosive to the handling equipment and abradant with regard to rubber or other corrosion-resistant linings which may be used.

With a phosphoric acid process according to this invention, however, the acid digestion and desired precipitation phases are operated at two different levels with controlled cooling therebetween but under circumstances where undesired scaling precipitation is avoided in the cooler apparatus and where large easily filtered crystals of precipitated material are formed by relatively slow crystal growing techniques. Thus, a primary digesting step is conducted at high temperature of 175°–180° F. in a primary reaction vessel or tank for the digestion or solubilizing or extraction of $P_2O_5$ from the phosphate rock starting material, and, thereafter, the reaction mixture is continuously led through a cooling step where the temperature is slowly reduced 15°–30° F. but without undesired scaling precipitation on the walls of the cooler and/or formation of undesired gypsum precipitate crystals of small size; thereafter the cooled slurry is held in a secondary digesting or reaction vessel at around 150°–170° F. for the gradual formation of readily filterable gypsum crystals of the size and type desired for subsequent filtration and washing, yet at temperature levels where the corrosive tendency of the material for the secondary digester vessel and agitation equipment therein is substantially minimized.

In such manner, then, it is only the primary digester vessel or tank and the agitation and pumping equipment in association therewith which must be equipped with highly corrosive-resistant materials, while subsequent equipment, not having to contain the reaction mixture at a highly corrosive temperature level, may be more inexpensively fabricated. Also, the utilization of the particular vacuum cooling step and apparatus in accordance herewith not only minimizes corrosion and prolongs the life of subsequent equipment, but also minimizes scaling of both the vacuum cooler and subsequent filters, and generally enhances the efficiency of the entire process by inducing during the cooling step and the subsequent second stage digestion the production of gypsum or other precipitate crystals of the desired size and form for more efficient filtration and/or washing.

The second stage crystal-growth or digesting step at a lower temperature also serves as a continuous reservoir for cooled digested slurry to be re-cycled into the primary digestion step for the ready control of temperature therein, so that, despite substantial temperature rise in the digestion step because of heat of reaction and heat of solution of the materials therein, a desired maximum temperature can be relatively automatically arranged in the primary digestion, merely by the recycled quantities of cooler slurries from the secondary step. Thus, the primary digestion may be continued at temperature levels below those which favor the production of clusters of needle shaped gypsum crystals (instead of the rhombic crystal form) and/or production of the gypsum hemihydrate—both of which substances, as well understood, may introduce difficulties of scale formation or washing or filtering. Once the crystal form of gypsum is determined, the shape will remain unchanged during subsequent crystal growth or precipitation, and, although the rhombic crystal form (the formation of which is promoted at lower temperatures) may produce a slower action on the filters, it has been found to produce better washing than the alternative gypsum crystal form of clusters of needle shaped crystals.

Referring now to the drawing, in which like reference characters refer to like parts throughout the several views thereof, there is indicated in FIG. 1 a system or arrangement for a phosphoric acid process in accordance herewith and as including a premix tank 10, primary digester vessel 11, and secondary digester vessel 12, with vacuum cooler 15 interposed in the line of flow. Tank 10, digesters 11 and 12, and cooler 15 are equipped with agitators respectively indicated at 18–22, driven in known manner as by motors or drive means indicated, respectively, at 23–27, for maintaining agitation and continuous homogeneous admixture of the liquids or slurries in the respective tanks or vessels.

Phosphate rock, crushed and prepared in known or conventional manner, enters the system through a suitable conveying means indicated generally at 30, and is mixed in premix tank 10 with a portion of cooled slurry from secondary digester 12. Such cooled slurry may be pumped from digester 12 into premix tank 10 through line 31 or, preferably, the apparatus is so disposed in the plant that the cool slurry will flow by gravity out of overflow 32 of digester 12 and through line 31 into premix tank 10. In any case, the volume of cooled slurry added to premix tank 10 is adjusted and controlled for regulating or adjusting the reaction temperature desired in primary digester 11. From premix tank 10, the rock slurry is conducted through line 33 into primary digester 11, into which is also introduced concentrated (e.g., 99%) sulfuric acid, as indicated at 34 and recycled weak (e.g., 30%) phosphoric indicated at 35, with both reactants being admixed automatically through mixing head 36 and entering digester 11 through line 37 for admixture and reaction therein with the phosphate rock slurry from premix tank 10. Fumes from primary digester 11 are withdrawn through line 39 and conducted, in conventional manner, to a fume scrubber, for the removal of obnoxious components thereof, and are then exhausted through a stack in known manner.

After the desired mixing and holding time in primary digester 11, the hot digested slurry is conducted from primary digester 11, through outlet 44 thereof and line 45 under the action of pump 46, to liquid inlet 47 in the bottom of vacuum cooler 15 for admixture with partially cooled slurry therein. A high vacuum (e.g., 25" or 28" of mercury) is maintained within cooler 15, as through vacuum exhaust 48 and vacuum and vapor line 49, in known manner, with, of course, the interposition in the vapor line of conventional vapor condensers (not shown). Such vacuum induces evaporation of liquid from the surface 50 of the liquid slurry in cooler 15, it being understood that heat removal from cooler 15 is accomplished by vacuum-induced evaporation of liquid from the slurry therein.

The size and capacity of cooler 15 and the pumping or recycling capacity of agitator 22 therein are all correlated with the volume and temperature of slurry entering through inlet 47 in order to maintain a pumping circulation rate or volume within cooler 15 substantially in excess of the rate of entering hot slurry. Thus, a substantial or predominant part of the cooling of hot slurry entering at 47 is accomplished by admixture and direct heat exchange with cooler slurry already present in cooler 15 by constant recirculation and mixing of the liquid materials therein and so that only a slight temperature drop (e.g., less than 5° F.) occurs by evaporation of any particular increment of the mixed slurry at surface 50 of the liquid within cooler 15, although the liquid at this surface and subject to evaporation is constantly changing through recirculation so that a large total amount of heat is removed to accomplish the entire temperature decrease desired.

Thus, if hot slurry at a temperature of about 180° F. is delivered into cooler 15 having a capacity of 4500 gallons through inlet 47 at the rate of about 1130 gallons per minute (as one might expect of a plant scaled to produce $P_2O_5$ at the rate of 100 tons per day), cooling the slurry down to 160° F. would require removing about 10 million B.t.u. per hour. According to conventional flash cooling techniques, such an amount of heat removal would be expected to produce a sufficiently drastic or quick incremental temperature drop in the slurry being cooled (e.g., at least 5° F. or more) to promote undesirably rapid precipitation of gypsum in the form of many small and hard to filter crystals as well as scaling precipitation of other substances on the walls of cooler 15 requiring periodic shutdowns for cleaning, etc.

If, on the other hand and in accordance herewith, cooler 15 is designed to have a capacity of about 4500 gallons of slurry and agitator 22 produces a continuous recirculation pumping of slurry and to the surface 50 of the liquid in cooler 15 at the rate of about 18,000 gallons per minute, the actual incremental temperature drop for each successive increment of slurry reaching surface for evaporation therefrom is only about 1.3° F. Similarly, with constant pumping recirculation by agitator 22 of slurry from the inlet 47 to evaporation surface 50 at the rate of 30,000 gallons per minute, as much as 18 million B.t.u. per hour may be removed by evaporation from a slurry having a specific gravity of about 1.6 and a sensible heat of about 0.6 B.t.u. per pound with an incremental temperature drop slurry surface 50 of only about 1.25° F. and sufficiently low to avoid inducing undesired rapid precipitation from the evaporating slurry. That is, the slow cooling and rapid high volume circulation promotes precipitation and crystal growth upon the surface of existing crystals in the slurry, rather than on the walls of cooler 15 and causes growth of existing crystals, rather than forming new precipitation nuclei or producing many tiny (even colloidal size) new crystals from the saturated or precipitating solution to complicate subsequent filtering and washing steps.

After the desired cooling and residence time in cooler 15, cool slurry is withdrawn therefrom through overflow 55 and drops through barometric leg 56 into secondary digester 12 for formation therein of the desired filterable gypsum crystals, etc., and to provide a source of cooled slurry for admixture with new phosphate rock in premix tank 10. After the desired residence time in secondary digester 12, the slurry, including the precipitated material suspended therein under the action of agitator 21, is withdrawn from secondary digester 12 from outlet 57 thereof and conducted, under the action of pump 58, through line 59 to the subsequent filtering and washing and purification steps of the process, which may be satisfactorily operated in known or conventional manner as well understood.

For some installations, a modification of the foregoing arrangement may be preferred along the lines suggested in FIG. 2. In this arrangement a combination premix and sealing tank 65 is positioned between primary digester 11 and secondary digester 12, with a dividing partition 66 being provided in tank 65 to divide it into a premixing section (to the left in the drawing) having an agitator 67 therein driven by drive means 68, and a sea'ing section (to the right in the drawing) into which barometric leg 56 from vacuum cooler 15 discharges. An overflow conduit 70 leads from the premixing section tank 65 into primary digester 11, and another overflow conduit 71 (preferably at a slightly higher level than conduit 70) leads from the sealing section of tank 65 into secondary digester 12. The crushed phosphate rock starting material is introduced into the premixing section of tank 65 in known manner as indicated by line 30.

With such an arrangement, the phosphate rock is mixed in the premix section of tank 65 with cooled slurry overflowing partition 66 from the material in the sealing section of tank 65 discharged thereinto from barometric leg 56 of vacuum cooler 15, and the slurry then enters primary digester 11 through overflow conduit 70, where it is treated with sulfuric acid and weak phosphoric acid, as previously described. Upon completion of the primary digestion, the digested hot slurry is pumped from primary digester 11, as by pump 74 therein, and conducted to vacuum cooler 15 through line 45 and liquid inlet 47 to be cooled therein, as previously described, by admixture with cooled slurry in cooler 15 and by evaporation from liquid surface 50 therein, after which the cool slurry overflows from cooler 15 through overflow 55 thereof and is discharged into the sealing side of tank 65 through barometric leg 56. That portion of the cooled slurry in the sealing section of tank 65 which is not admixed with new raw material in premixing section of tank 65 overflows through overflow conduit 71 into secondary digester 12. As indicated in the drawing, the respective heights of overflow conduits 70 and 71 in tank 65 are correlated automatically to split the flow of cooled slurry from cooler 15 between primary digester 11 and secondary digester 12 with an amount equal to production going to secondary digester 12 and the balance of the flow to the primary digester 11.

As will be understood, particularly with a phosphoric acid process of the character described, it may usually be desired to recycle through primary digester 11 (for the purpose, as noted, of controlling the temperature thereof or otherwise) a larger portion of the cooled slurry from cooler 15 than is directly introduced into secondary digester 12. For example, for the production of about 100 tons per day of $P_2O_5$ in accordance herewith while maintaining a maximum temperature of about 180° F. in primary digester 11, about 1130 gallons per minute of hot slurry is introduced into vacuum cooler 15 in order to maintain the desired temperature and concentration conditions in primary digester 11. In such a case, about 1000 gallons per minute of cooled slurry (at about 160° F.) are recycled into primary digester 11 through the premixing section of tank 65 (or through premixing tank 10 in FIG. 1), while only about 130 gallons per minute are directly introduced into secondary digester 12 from cooler 15. For the production of $P_2O_5$ at about 225 tons per day, as a further example, about 2800 gallons per minute of hot slurry is introduced from primary digester 11 into cooler 15, and some 2500 gallons per minute of cool slurry are recycled through primary digester 11, while only 300 gallons per minute of the flow of slurry from cooler 15 are directly introduced into secondary digester 12.

As will be understood, of course, such illustrative figures or proportioning will vary in accordance with the material being treated as well as the desired temperature to be maintained in primary digester 11 and/or to be achieved by vacuum cooler 15. Nevertheless, an arrangement such as shown in FIG. 2 automatically adjusts the desired proportioning for whatever materials are being treated in that particular plant, and substantially throughout a range of varying flow rates within the rated capacity for which specific installation is designed for handling a particular material in accordance herewith.

Although a wide variety of constructions may be utilized, as will be understood, for the various tanks and vessels in accordance herewith, satisfactory results are achieved by constructing the several tanks or vessels 10, 11, 12, and 65 in the form of closed steel tanks lined with a corrosion-resistant rubber or neoprene with an inner lining of acid brick set in sulfur cement and a layer of carbon bricks set in furan resin, although a somewhat less expensive satisfactory construction, particularly for primary and secondary digesters 11 and 12, is concrete (so called "Gunite") tanks unlined or lined with acid brick and, if desired, further lined with carbon brick in particularly those areas of the walls thereof on which directly impinge streams of flow created by agitators 19–21, etc., which bricks also form satisfactory materials for constructing partition 66 in tank 65. Preferably digesters 11 and 12 are of conventional circular cross section and, if desired, with a radial baffle extending thereinto between the points of inlet and outlet of the liquid slurry to minimize short circuiting thereof through the tank, although it has been found that satisfactory results are achieved without such a baffle if alternate agitators 19, 20, etc., are arranged to be counter rotating. The overall size of the digesters and other tanks or vessels (and, as will be understood, the number of agitators therein) are readily determined depending upon the desired capacity of the plant and throughput rate of the various materials. Satisfactory results are obtained with the primary and secondary digesters 11 and 12, and whatever premix arrangement 10 or 65 is desired, being dimensioned to accommodate a total residence time of slurry of about six hours in the digesters (approximately evenly divided between primary and secondary digesters) at generally the operating conditions noted above, and with the dimensioning and capacities of the appertaining equipment, including vacuum cooler 15 as discussed above, being correlated with such throughput conditions.

As will be understood from the foregoing, the utilization of a vacuum cooler 15 of the character described indicates lifting the hot slurry from digester 11 to the elevated cooler 15, in order, for example to take advantage of the barometric leg 56 and the sealing thereby of the vacuum in cooler 15 to maintain this vacuum (and variations therein) substantially independent of the liquid levels and pressure in digesters 11 and 12. It may be desired, particularly with highly corrosive and abrasive slurries such as those encountered in the manufacture of phosphoric acid, to arrange for lifting hot slurry from digester 11 into cooler 15 by means other than mechanical pumping because, for example, of the extra expense or complications of providing pumping equipment having the necessary resistance to corrosion, etc.

One such satisfactory slurry-lifting means with which satisfactory results are achieved in accordance herewith is illustrated in FIG. 3 as an air lift arrangement which eliminates direct contact of the corrosive or abrasive slurry with mechanical moving parts. Thus, an air lift leg or pipe 80 is provided in primary digester 11 and extending for a substantial distance above the liquid level 81 therein. An air nozzle 82, supplied with a source of compressed air as through line 83, is positioned adjacent the bottom end of pipe 80 to provide an air lift action for hot slurry from digester 11 in known manner to an elevated casing 85 connected by a launder or flume 86 to a seal tank 87 into which extends a barometric leg or pipe 88 from liquid inlet 47 of vacuum cooler 15. Casing 85 also is provided with an air vent 90 at the top thereof and a foam overflow 91 for returning to digester 11 foam produced in the hot slurry by the bubbling of air therethrough during lifting of the slurry up through air lift pipe 80. Preferably the air furnished to air lift pipe 80 is admixed with steam in an amount in excess of that required to saturate the air at the temperature of the hot slurry being lifted to avoid evaporation or precipitation of the slurry and scaling of air lift pipe 80, etc. As indicated in FIG. 3, the upper end of air lift leg 80 extends for a substantial distance above the bottom of casing 85 and the bottom of launder 86. Also, the lowest portion of seal tank 87 and barometric leg 88 are, on the one hand, below the upper end of pipe 80 and overflow 91 as well as, on the other hand, well above either liquid level 81 in primary digester 11 or liquid level 92 in secondary digester 12, which is, in turn, above liquid level 81 in primary digester 11.

As will be understood from the foregoing, hot slurry is lifted from digester 11 through pipe 80 and up into casing 85 by air pressure from nozzle 92. Such lifted slurry flows through launder 86 into seal tank 87, at a level well above liquid level 81 in digester 11 or liquid level 92 in digester 12, and forms a liquid seal in tank 87 around the lower end of barometric leg 88. The vacuum maintained within vacuum cooler 15 (through vacuum line 49) causes slurry from seal tank 877 to be sucked up barometric leg 88 into cooler 15 for circulation and cooling therein as previously described, after which the cooled slurry overflows through 55 from cooler 15 and drops through barometric leg 56 thereof into secondary digester 12, which latter movement does not interfere with the air pressure or vacuum lifting of the hot slurry because, for example, of the arrangement of liquid levels in seal tank 87, etc., to be well above the liquid levels 81 and 92 in digesters 11 and 12 and with the liquid level 92 in digester 12 (sealing around overflow barometric leg 56) being higher than the liquid level 81 in digester 11. It is also to be noted that the utilization of such an air lift arrangement requires relatively little more total elevation to vacuum cooler 15 than in a situation where the hot slurry was lifted to cooler 15 by mechanical pumping, it being desired that cooler 15 be positioned sufficiently above the liquid level 92 in digester 12 or the liquid level in seal tank 65, in any case, for the effective and efficient utilization of barometric leg 56 from overflow 55 of cooler 15 as a seal with regard to the high vacuum maintained in the upper portion of cooler 15.

A further modification, particularly adapted for aiding in the desired high volume circulation or pumping within the vacuum cooler, is illustrated in FIG. 4 as showing a vacuum cooler comprising a tank 100 with a liquid inlet 101 near the bottom thereof for introduction thereinto of a hot liquid or slurry material to be cooled, and a liquid outlet 102 also in the bottom thereof for the removal from tank 100 of cooled material, which removal may be by pumping or otherwise. A vacuum is maintained in tank 100 through vapor outlet 103 and vacuum line 104 in the space above the liquid level 105 in the cooler. In this construction, the pumping agitator 110 is generally of the form of a ship propellor oriented to direct liquid flow downwardly in tank 100 and driven by motor 111 through shaft 112. A circular baffle 115 is mounted in tank 100 coaxially therewith and around pumping impeller 110.

With such an arrangement, continuous and violent recirculation and mixing of liquid or slurry material in tank 100 is achieved by the action of impeller 110 forcing slurry from liquid surface 105 downwardly through the inside of cylindrical baffle 115, with such slurry being again drawn upwardly outside the baffle, as indicated by the flow arrows in FIG. 4. Such circulation path, also, entrains hot material entering inlet 101 and carries it upwardly in tank 100 with mixing and heat exchange with cooler material already therein, while also assuring constant and rapid change of the particular increments of the liquid or slurry material exposed to evaporating surface 105. After a desired residence time in tank 100, the cooled material is withdrawn through outlet 102, where, again, the violent and directed flow of recirculation currents from impeller 110 through cylindrical baffle 115 also minimizes possible short circuiting of hot entering material from inlet 101 directly to outlet 102, yet without necessitating a liquid flow circuit interfering with either the desired constant recirculation of material throughout the interior of tank 100 or affecting the independent maintenance of vacuum conditions in tank 100 above liquid level 105 therein. Correlation or adjustment of the flow rates of material entering at inlet 101 and leaving through outlet 102 readily controls the residence time of material within tank 100 and, accordingly, both the rapidity and extent of cooling to which such material is subjected. As will be understood, the size or capacity of tank 100 as well as the size and pumping capacity of impeller 110 and the dimensioning of baffle 115 are all readily selected and correlated to accommodate the desired cooling or other effects and throughputs depending on the particular material to be treated and depending upon whether merely cooling is desired in tank 100 or a further retention of material therein for controlled precipitation or otherwise may be desired.

Thus, there are provided in accordance herewith systems and apparatus applicable to a wide variety of chemical processes in which solution or digestion or reaction is desired in a high temperature step while settling or crystal growth or other functions are desired in a subsequent low temperature step, as well as provisions and techniques for limiting the corrosive tendencies of some chemical processes to a preliminary high temperature reaction step while conducting separately subsequent steps of the process at lower temperatures and under less corrosive conditions. There is also provided herewith vacuum cooling apparatus and techniques whereby substantial total cooling can be achieved at controlled rates and substantial quantities of heat readily and continuously removed from a liquid or slurry material without subjecting such material generally to sharp or flash evaporation temperature decreases causing undesired precipitation or other disadvantageous conditions in the vacuum cooler or in subsequent steps of the processing.

While the forms of apparatus and methods herein described constitute preferred embodiments of the invention, it is to be understood that the invention is not limited to these precise forms and methods of apparatus, and that changes may be made therein without departing from the scope of the invention which is defined in the appended claims.

What is claimed is:

1. In a chemical process involving a first chemical reaction stage at high temperature followed by a subsequent reaction stage at a substantially lower temperature, the steps which comprise continuously conducting said first reaction stage at said high temperature in a first reaction zone, continuously introducing all of the reacted components from said first reaction stage into a vacuum cooling zone, maintaining said high temperature reacted components in said vacuum cooling zone for cooling therein from said high temperature to said substantially lower temperature with admixture of high temperature reacted components entering said cooling zone with partially cooled components previously introduced thereinto, removing heat from said admixed components in said vacuum cooling zone by vacuum-induced evaporation from said admixed components, controlling said heat-removing evaporation from individual increments of said components in said cooling zone for effecting a temperature decrease of said individual increments of only a minor fraction of the total temperature decrease in said cooling zone, and continuously conducting all of said cooled admixed reaction components from said cooling zone into a secondary reaction zone for said subsequent reaction stage at said substantially lower temperature.

2. In a chemical process for solubilizing and dissolving reactant components at high temperature in a dissolving stage followed by precipitation of at least some of said dissolved components from said solution in a subsequent precipitation stage at a substantially lower temperature, the steps which comprise continuously conducting said solubilizing and dissolving stage in a dissolving zone at said high temperature forming a hot solution of said components, continuously introducing all of said hot solution from said dissolving stage into a vacuum cooling zone for cooling therein to said substantially lower temperature for said precipitation stage, admixing said hot solution entering said vacuum cooling zone with partially cooled solution previously introduced therein for partial slow cooling of said entering hot solution, removing heat from said admixed solutions in said cooling zone by vacuum-induced evaporation from said solutions, controlling the amount of heat removed from successive individual increments of all of said solution by evaporation in said cooling zone for maintaining the temperature decrease of said individual increments of solution at only a minor fraction of the total temperature decrease in said cooling zone from said high temperature to said substantially lower temperature for preventing undesired rapid precipitation of components from said solutions in said cooling zone, and conducting said subsequent precipitation stage with said solutions upon cooling thereof from said high temperature to said substantially lower temperature.

3. In a chemical reaction process in which a hot liquid reaction mixture from a first reaction stage is to be cooled through a substantial temperature reduction prior to a subsequent reaction stage and in the absence of a drastic temperature drop inducing undesired precipitation during said cooling, the steps which comprise continuously introducing said hot reaction mixture from said first reaction stage into a vacuum cooling zone containing a partially cooled mixture from said reaction stage previously introduced into said cooling zone, admixing all of said hot reaction mixture in said cooling zone with said partially cooled mixture therein for direct heat transfer from said hot reaction mixture to said partially cooled reaction mixture, circulating said mixtures in said cooling zone at a flow rate substantially in excess of the flow rate in which said hot reaction mixture is introduced into said cooling zone, continuously presenting to the surface of said mixtures in said cooling zone different increments thereof for evaporation therefrom at said surface, maintaining a vacuum in said cooling zone above said liquid surface therein effecting flash evaporation from said increments of said mixtures at said surface for heat removal therefrom, said rate of recirculation of said mixtures within said cooling zone being sufficiently greater than said rate of introduction of said hot mixture into said cooling zone that the temperature drop of each said increment of said mixtures at said surface induced by said evaporation is only a minor fraction of said total temperature reduction through which said hot liquid reaction mixture is cooled in said cooling zone prior to said subsequent reaction stage of said process.

4. In a process in which a hot solution is to be cooled through a substantial temperature reduction at a controlled rate of cooling for precipitation of components from said solution into a desired precipitate form not obtainable if said hot solution were rapidly subjected to said substantial temperature reduction, the steps which comprise introducing said hot solution into a vacuum cooling zone containing partially cooled portions of said solution previously introduced into said cooling zone, admixing said hot solution in said cooling zone with said partially cooled portions therein for direct heat transfer from said hot solution to said partially cooled solution forming a partially cooled admixture of solutions, recirculating said admixture of solutions in said cooling zone at a flow rate substantially in excess of the flow rate at which said hot solution is introduced into said cooling zone, continuously presenting to the liquid surface of said admixture of solutions in said cooling zone different increments thereof, maintaining a vacuum in said cooling zone above said liquid surface therein effecting flash evaporation from said admixture of solutions at said liquid surface with heat removal therefrom by said evaporation, and controlling said rate of circulation of said different increments of said admixture of solutions at said liquid surface and the rate of heat removal from said increments by said evaporation for maintaining the temperature reduction of each said increment of solution by said evaporation at only a small fraction of said substantial temperature reduction to which said hot solution is to be subjected to control the rate of cooling of each said increment of said solution through said substantial temperature reduction to a value at which said desired precipitate form is obtained.

5. In a process for the manufacture of phosphoric acid by the solubilizing and digestion of phosphate from phospate-containing rock with sulfuric acid and the separation of the desired dissolved product by precipitation of sulfate and silicate and other by-products from the reaction mixture, the steps which comprise introducing a liquid slurry of said phosphate-containing rock and said sulfuric acid reactant into a primary digestion zone for said solubilizing and digestion of said phosphate at elevated temperatures of the order of about 170°–180° F. and with concomitant formation of said by-products in said primary digestion zone, conducting said hot reaction mixture slurry from said primary digestion zone into a vacuum cooling zone for cooling said hot slurry to a substantially lower temperature of the order of about 15°–30° F. less than said elevated temperature at a controlled slow cooling rate for avoiding undesired rapid precipitation of said by-products into an undesired precipitate form during said cooling of said slurry, partially cooling said hot slurry by admixture in said cooling zone with partially cooled slurry previously introduced thereinto, circulating said slurries admixed in said cooling zone at a flow rate substantially in excess of the rate at which said hot slurry is introduced into said cooling zone from said primary digestion zone, continuously presenting to the surface of slurry in said cooling zone different increments of said slurry for evaporation at said surface, maintaining a vacuum in said cooling zone above said surface effecting said evaporation and heat removal from said slurry, controlling the rate of said heat removal from said different increments of slurry at said surface and the flow rate of circulation of slurry in said cooling zone to maintain the temperature reduction in each of said different increments of slurry by heat removal at said surface at only a minor fraction of the order of less than one-third of the entire temperature reduction to which said slurry is subjected in said cooling zone for avoiding undesired precipitation of said by-products, withdrawing said slurry from said cooling zone after cooling thereof for precipitation of said by-products and completion of said phosphoric acid manufacture.

6. A process as recited in claim 5 in which a portion of said cooled slurry withdrawn from said cooling zone is recycled for admixture with said slurry of said phosphate-containing rock introduced into said primary digestion zone for controlling the temperature reaction in said zone.

7. A process as recited in claim 5 in which said surry is cooled in said cooling zone through a temperature reduction of approximately 15°–25° F., but in which said different increments of said slurry at said surface thereof in said cooling zone are individually subjected to a temperature reduction of less than about 5° F. by said heat removal upon evaporation therefrom.

8. A process as recited in claim 5 in which said flow rate of recirculation of said slurry in said cooling zone is at least ten times the flow rate of said hot slurry entering said cooling zone.

References Cited by the Examiner

UNITED STATES PATENTS

| | | | |
|---|---|---|---|
| 2,699,985 | 1/1955 | Delruelle | 23—165 |
| 2,710,247 | 6/1955 | Knowles et al. | 23—165 |
| 2,807,521 | 9/1957 | Lambe et al. | 23—165 |
| 2,887,362 | 5/1959 | Lee | 23—165 |
| 2,963,876 | 12/1960 | Hibbs | 62—268 |
| 2,996,898 | 8/1961 | Hosken et al. | 62—268 |

BENJAMIN HENKIN, *Primary Examiner.*

MAURICE A. BRINDISI, *Examiner.*

A. SCIAMANNA, O. CRUTCHFIELD,
*Assistant Examiners.*